G. W. ALDRICH.
Dinner-Pail and Lamp.
No. 161,921.  Patented April 13, 1875.
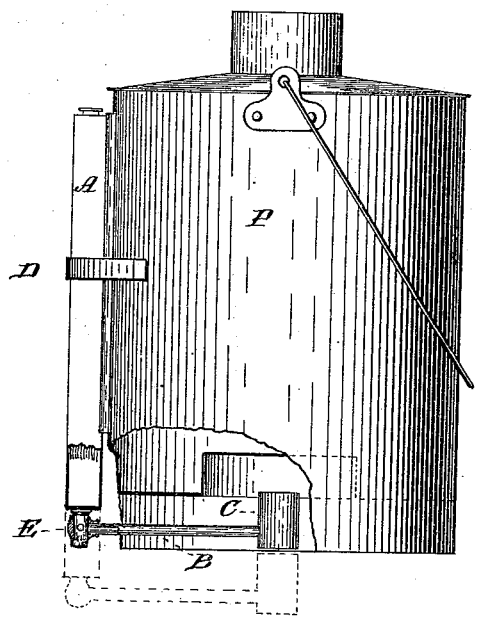
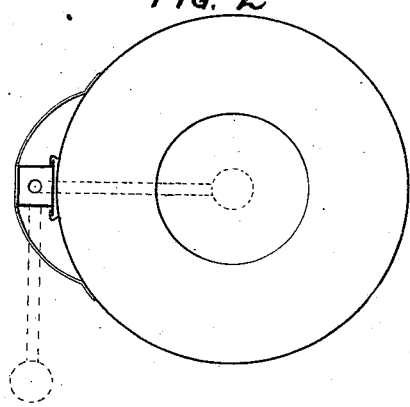
Witnesses
C. W. Smith
Louis Marshall
Inventor
George W. Aldrich
THE GRAPHIC CO.PHOTO-LITH.39 & 41 PARK PLACE,N.Y.

UNITED STATES PATENT OFFICE.

GEORGE W. ALDRICH, OF SYRACUSE, NEW YORK, ASSIGNOR OF ONE-HALF HIS RIGHT TO WILLIAM H. BOND, OF SAME PLACE.

IMPROVEMENT IN DINNER-PAILS AND LAMPS.

Specification forming part of Letters Patent No. 161,921, dated April 13, 1875; application filed January 12, 1875.

*To all whom it may concern:*

Be it known that I, GEORGE W. ALDRICH, of Syracuse, Onondaga county, New York, (assignor to myself and WILLIAM H. BOND, of the same place,) have invented certain new and useful Improvements in Dinner-Pails; and I do hereby declare that the following is a full, clear, and exact description of the same, reference being had to the accompanying drawings, which form a part of this specification, in which—

Figure 1 is a side view of the pail, and the attachment with the pail partially cut away. Fig. 2 is a view of the same looking at the bottom of it.

The letters used represent corresponding parts wherever they occur.

This invention consists in attaching to the side of a dinner-pail, P, such as is ordinarily carried by mechanics and workingmen, an apparatus for heating or warming the contents. This apparatus consists of a long narrow reservoir, A, for holding oil, at the bottom of which is attached, at right angles to it, a pipe or tube, B, at the extremity of which is placed a small tin cup, C, for holding the wick. This tube B is attached to the reservoir A by what is termed a "swing-cock joint," E, in which is an opening that operates as a cut-off, when desired. The reservoir A may be fastened to the pail P by any ordinary slide, or a slide and dovetail arrangement; and to hold it secure in any position desired on the side of the pail, the spring D is fastened to it transversely, or may be placed under it on the pail, and made to press against the pail on both sides of the reservoir, holding it in place by the pressure upon it, or may be held in any other ordinary manner. In the lower circumference of the pail are cut two slots or openings—one for the tube B and the other for the cup C to pass through, the bottom of the pail P being raised an inch or more above the lower part of the sides of the pail, as shown in the drawings. The bottom of the pail P is made with the center raised, as shown in the drawings, in order to obtain a greater surface and a better one for heating.

The operation of this apparatus is as follows: The reservoir A, filled with oil, with the tube B and cup C attached, is placed on the side of the pail, as shown in Fig. 1. It is then pushed or drawn down below the side of the pail P, as shown by the dotted lines in Fig. 1, the tube C being drawn down out of the slot through which it passes. The tube B and the cup C are then swung around until they stand out square from the side of the pail P, as partially shown in the dotted lines in Fig. 2. When thus swung around the cut-off in the joint D is opened, and the oil flows through the tube B into the cup C, saturating the wick. Turning the tube back cuts off the supply of oil entirely, and leaves in the tube and wick a sufficient quantity to warm the contents of the pail. The wick is then lighted and swung back through the slot, and pushed up into its place under the center of the pail, bringing the flame directly beneath the elevated part of the bottom of the pail. This speedily accomplishes the heating or cooking desired.

Having thus described my invention, and the mode of operation thereof, what I desire to secure by Letters Patent of the United States, is—

The reservoir A, tube B, cup C, and cut-off E, combined with the dinner-pail, P, and operated and constructed substantially as described.

GEORGE W. ALDRICH.

Witnesses:
C. W. SMITH,
LOUIS MARSHALL.